US007628443B2

(12) United States Patent
Krajenke

(10) Patent No.: US 7,628,443 B2
(45) Date of Patent: Dec. 8, 2009

(54) SELF-ENGAGING ROD RETAINING CLIP

(75) Inventor: Gary W. Krajenke, Warren, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 317 days.

(21) Appl. No.: 11/775,405

(22) Filed: Jul. 10, 2007

(65) Prior Publication Data

US 2009/0015034 A1 Jan. 15, 2009

(51) Int. Cl.
*B60J 1/08* (2006.01)

(52) U.S. Cl. .................................... 296/146.1; 16/308

(58) Field of Classification Search ............. 296/146.1, 296/97.12, 97.13
See application file for complete search history.

(56) References Cited

U.S. PATENT DOCUMENTS

| | | | | | |
|---|---|---|---|---|---|
| 2,702,401 | A | * | 2/1955 | Vigmostad et al. | 16/302 |
| 2,871,505 | A | * | 2/1959 | Clark et al. | 16/308 |
| 2,894,277 | A | * | 7/1959 | Bogater et al. | 16/298 |
| 2,986,770 | A | * | 6/1961 | Hammond | 16/308 |
| 3,171,156 | A | * | 3/1965 | Peras | 16/235 |
| 3,211,494 | A | * | 10/1965 | Husko | 296/76 |
| 3,550,185 | A | * | 12/1970 | Marchione | 16/297 |
| 3,820,192 | A | * | 6/1974 | Nakano | 16/334 |
| 3,889,316 | A | * | 6/1975 | Koike | 16/297 |
| 3,969,789 | A | | 7/1976 | Wize | |
| 4,285,098 | A | * | 8/1981 | Hicks et al. | 16/308 |
| 4,706,334 | A | * | 11/1987 | Beckwith | 16/308 |
| 4,720,895 | A | * | 1/1988 | Peebles | 16/264 |
| 6,018,912 | A | | 2/2000 | Baughman et al. | |
| 6,070,929 | A | * | 6/2000 | Barkley | 296/76 |
| 6,811,208 | B1 | | 11/2004 | Kettinger | |
| 6,938,303 | B2 | * | 9/2005 | Watson et al. | 16/334 |
| 7,585,013 | B2 | * | 9/2009 | Brown et al. | 296/146.11 |

* cited by examiner

*Primary Examiner*—Kiran B. Patel

(57) ABSTRACT

A self-engaging rod retaining clip assembly for retaining a rod and a method of retaining the rod to a vehicle closure support component is disclosed. The self-engaging rod retaining clip assembly holds a rod retaining clip in a desired position on a vehicle closure support component until the rod is installed. Installing the rod includes pressing the rod against a rod pivoting flange, which causes clip retention flanges to flex outward around a clip support arm until the rod is sufficiently retained inside a rod channel in the support component. The clip retention flanges then snap towards each other to retain the clip, and hence the rod, in the support component.

8 Claims, 3 Drawing Sheets

SELF-ENGAGING ROD RETAINING CLIP

BACKGROUND OF INVENTION

The present invention relates generally to clips for retaining rods associated with vehicle closures.

For vehicle closures that open by swinging upward, it is usually desirable to provide some type of mechanical assistance for opening and holding such closures in an open position. For example, a torque rod counterbalance system may be employed since it is a cost-effective and reliable type of counterbalance system, and also because it is not susceptible to temperature variations as are other types of counterbalance systems.

One place where such torque rod counterbalance systems may be employed are passenger car deck lids that cover trunk openings. The torque rod engages the deck lid hinge and is pre-loaded with torque to counterbalance the weight of the deck lid and allow for initial lid movement upon release of a latch. One or more torque rods may be employed to engage the pair of deck lid hinges. The nature of torque rod counterbalance systems traditionally require the torque rods to be installed after the vehicle paint process is complete and the vehicle is in a general assembly area for further installation of other components. This is done because, if they are wound up (pre-stressed) in position prior to (and during) the vehicle painting process, the torque rods will lose some of the initial toque pre-stress due to the heat of the paint process. Also, it is undesirable to create stresses in the deck lid prior to (and during) paint processing, which can occur if the torque rods are pre-stressed during paint processing.

On the other hand, there are assembly process reasons that make it desirable to mount the torque rods to the vehicle prior to paint operations. Since it is still desirable to assure that the torque rods are not pre-stressed during paint operations, some means to retain the unstressed torque rods in position in the vehicle during paint operations is desired. Preferably, this means is relatively simple, quick, reliable and inexpensive since the torque rods will still have to undergo final assembly steps where they are wound up (pre-stressed) and engaged with the deck lid hinges after the paint operations are completed.

Some have attempted to provide such a means by employing a positive retention torque rod retaining clip. These clips typically include tabs that are plastically bent (crimped) to retain the torque rod in position during paint operations. But these devices are undesirable in that they require a relatively high insertion force and have been known to accidentally release the torque rods prior to being assembled to the final vehicle location. Thus, the clips tend to be less reliable as a retention method than is desirable. Also, the clips may be out of position at the time of torque rod insertion, so a two-hand operation (one to hold the clip in the correct position and one to hold the rod) is needed.

SUMMARY OF INVENTION

An embodiment contemplates a self-engaging rod retaining clip assembly for retaining a rod. The rod retaining clip assembly comprises a vehicle closure support and a rod retaining clip. The vehicle closure support component includes a main body defining an arcuate-shaped rod channel having a rod channel opening, and a clip support arm extending from the main body adjacent to the rod channel and the rod channel opening, the clip support arm having a first side and an opposed second side and including an arm pivot hole recessed in the first and second sides. The rod retaining clip includes a clip main body having a rod retention flange extending from the clip main body outside of the rod channel when the rod retaining clip is in a pre-rod installation position; a rod pivoting flange extending from the clip main body across a portion of the rod channel opening when the rod retaining clip is in the pre-rod installation position, with the clip main body, the rod retention flange and the rod pivoting flange defining a rod recess that is shaped to receive a rod therein; a pair of clip retention flanges extending from the main body and defining an arm slot therebetween, the clip retention flanges each having a hold-open portion where a width of the arm slot between the hold-open portions is about equal to a width of the support arm, a clip securing portion where the width of the arm slot between the clip securing portions is less than the width of the arm slot between the hold-open portions, and a tapered clip spreading portion extending between the respective hold-open portions and clip securing portions; and a pivot pin pivotally securing the rod retaining clip to the clip support arm.

An embodiment contemplates a method of pre-installing a torque rod to a vehicle closure support component, the method comprising the steps of: pivotally supporting a rod retaining clip on a clip support arm of the vehicle closure support component adjacent to a rod channel with a rod pivoting flange of the rod retaining clip extending across a portion of a rod channel opening and a rod retention flange extending outside of the rod channel; maintaining the rod retaining clip in a pre-rod installation position by trapping the clip support arm between a web of the rod retention flange and hold-open portions of a pair of clip retention flanges; pressing the torque rod against the rod pivoting flange to cause the clip retention flanges to flex around the clip support arm and the rod pivoting flange to pivot into the rod channel; and pressing the torque rod further into the rod channel until the clip retention flanges no longer align with the clip support arm, allowing the clip retention flanges to snap toward each other.

An advantage of an embodiment is that the self-engaging rod retaining clip assembly minimizes assembly operator installation efforts for insertion, but positively and reliably secures vehicle torque rods during assembly plant processing. This clip is also relatively inexpensive, and quick and easy to use. No crimping (plastically bending tabs) is needed for installation, and the clip is automatically maintained in the correct position for torque rod insertion until the torque rod is actually inserted.

DETAILED DESCRIPTION

Figure 1:
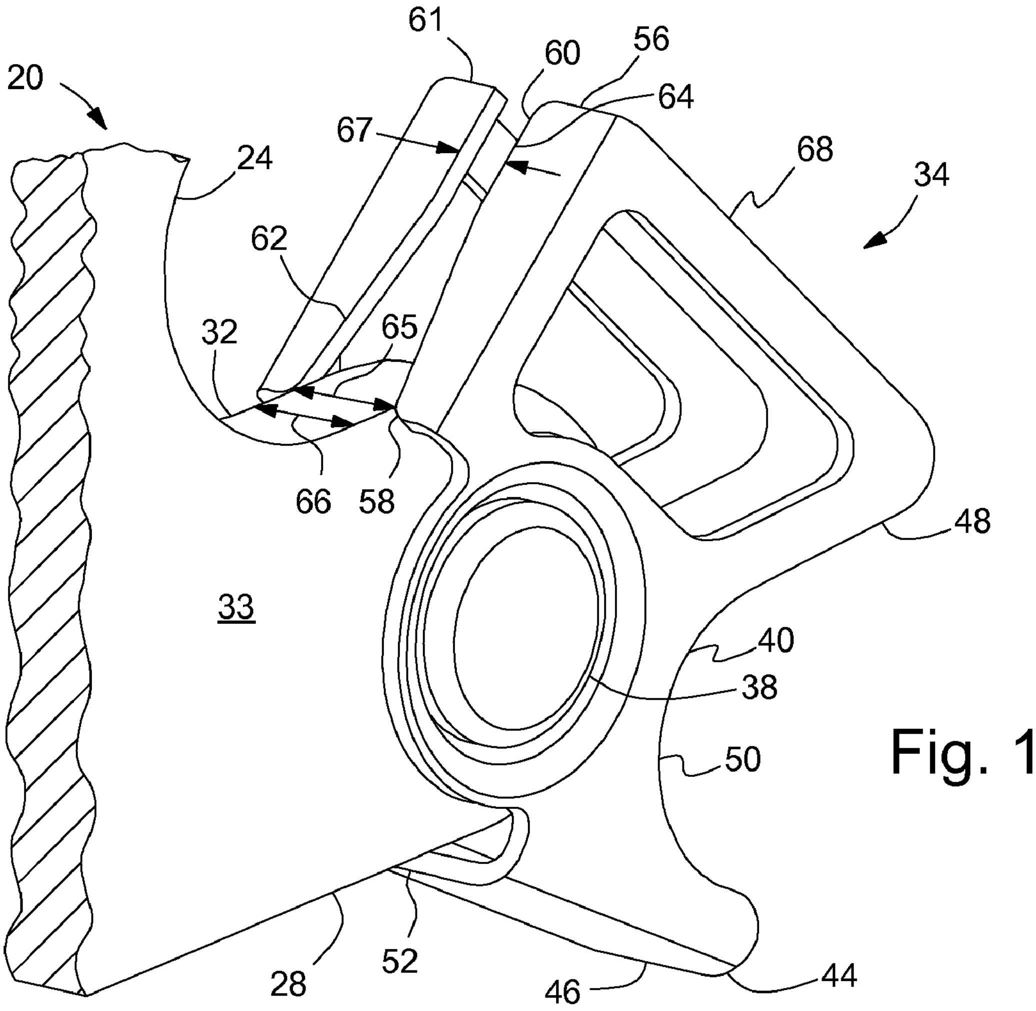
FIG. 1 is a perspective view of a self-engaging rod retaining clip mounted on a vehicle closure support component, with the clip in a pre-rod installation (open) position.

Referring to FIGS. 1-5, a vehicle closure support component, indicated generally at 20, is shown. The component 20 may be, for example, a hinge box or a hinge link (that drives a gooseneck strap) associated with a vehicle deck lid (not shown), or in a tailgate (not shown) or lift gate (not shown) counterbalance system. The component 20 includes a component main body 22 that defines an arcuate-shaped rod channel 24 having a rod channel opening 26. A clip support arm 28 extends from the main body adjacent to the rod channel 24 and rod opening 26. The support arm 28 includes an arm pivot hole 30 adjacent to the rod opening 26, and has a first side 32 and an opposed second side 33. A self-engaging rod retaining clip 34 is mounted on the support arm 28. While one support component 20 and one rod retaining clip 34 are shown, there are preferably two (spaced apart) for supporting each torque rod 36 on the vehicle (not shown). However, since the second rod retaining clip 34 can essentially be the same as the first, only one is shown herein. The torque rod 36 may be conventional, if so desired, and so will not be shown in detail herein.

The self-engaging rod retaining clip 34 includes a clip main body 40 having a pair of clip pivot holes 42 coaxially aligned with the pivot hole 30. A pivot pin 38 extends through the holes 30, 42, securing the clip 34 to the support arm 28, while allowing the clip 34 to rotate relative to the support arm 28. A rod retention flange 44, having a central web 46, extends from the clip main body 40. An end 52 of the central web 46 defines an initial position retaining flange (discussed below). Also, a pair of rod pivoting flanges 48 extend from the clip main body 40 on opposed sides 32, 33 of the support arm 28. The rod retention flange 44, pivoting flanges 48 and clip main body 40 define a rod recess 50. A pair of clip retention flanges 56 also extend from the clip main body 40 on opposed sides 32, 33 of the support arm 28, defining an arm slot 64.

Each clip retention flange 56 includes a rounded hold-open portion 58 on a first end 59, a clip securing portion 60 extending adjacent to an opposed second end 61, and a tapered clip spreading portion 62 extending between the hold-open potion 58 and the clip securing portion 60. These portions 58, 60, 62 define the arm slot. A width 65 of the arm slot 64 between the hold-open portions 58 is about equal to or slightly smaller than a width 66 of the clip support arm 28 adjacent to the hold-open portion 58 when the clip 34 is in its pre-rod installation position. A width 67 of the arm slot 64 between the clip securing portions 60 is smaller than the width 65, with a width of the arm slot 64 tapering from the width 65 to the width 67. A pair of clip support flanges 68 may extend between the second end 61 and the pair of rod pivoting flanges 48.

As an alternative, the tapered clip spreading portion 62 may incorporate the hold-open portion by having the clip spreading portions 62 near the first end 59 spaced apart about equal to or slightly wider than the support arm width 66 and then tapering towards each other as they extend to the clip securing portions 60. Also, if so desired, the clip securing portions 60 may continue the taper rather than extending generally parallel to each other. This accomplishes a similar result in that the desire is to gradually flex the clip retention flanges 44 apart as the retaining clip 34 is rotated relative to the support arm 28 until the retention flanges 44 snap past the support arm 28 (discussed in more detail below).

The initial pre-paint-operations assembly of the torque rod 36, with reference to FIGS. 1-5, will now be described. The rod retaining clip 34 is installed onto the clip support arm 28 in its pre-rod installation position (shown in FIG. 1), with the end 52 of the central web 46 pressed against the clip support arm 28 and the hold-open portions 58 also pressed against the clip support arm 28. Since the width 65 of the arm slot 64 between the hold-open portions 58 is about equal to or slightly less than the width 66 of the clip support arm 28, the retaining clip 34 will inherently be held in this position. In the pre-rod installation position, the rod recess 50 faces outward away from the rod channel 24, allowing for easy alignment of the torque rod 36 with this channel 24. Positively holding the retaining clip 34 in this position makes assembly easier since the assembler knows what the clip position will be on each vehicle, and one hand will not have to be used to reposition the clip while the other hand moves the torque rod 36 into position in the recess 50.

Figure 2:
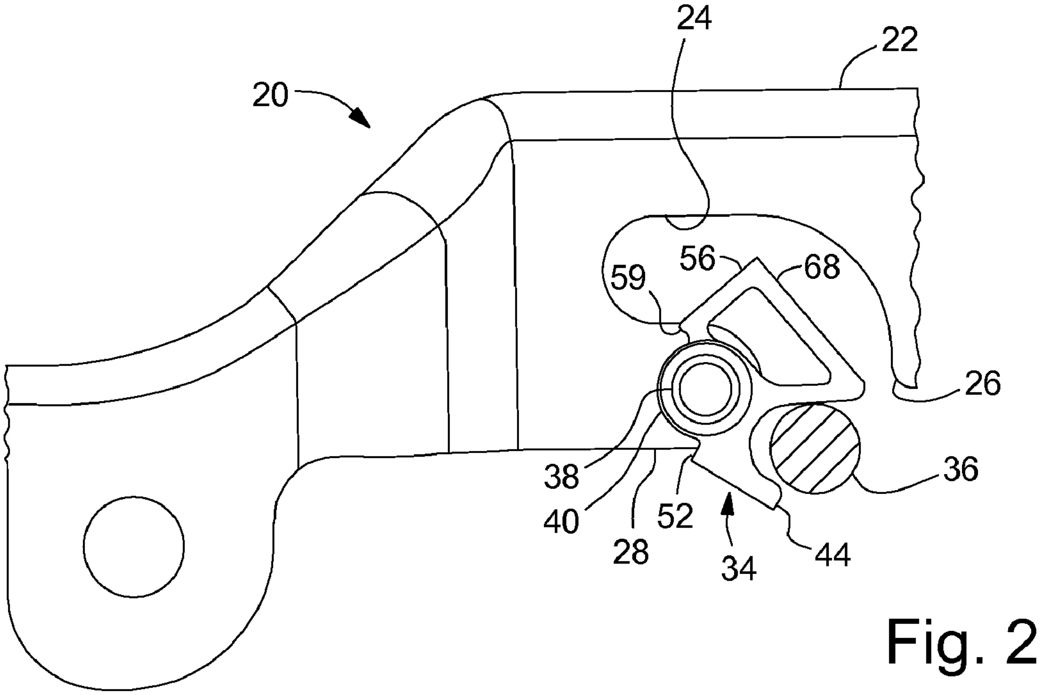
FIG. 2 is a side view, on a reduced scale, of the clip and support component of FIG. 1, and a rod shown initially contacting the clip in the pre-rod installation position.
Figure 3:
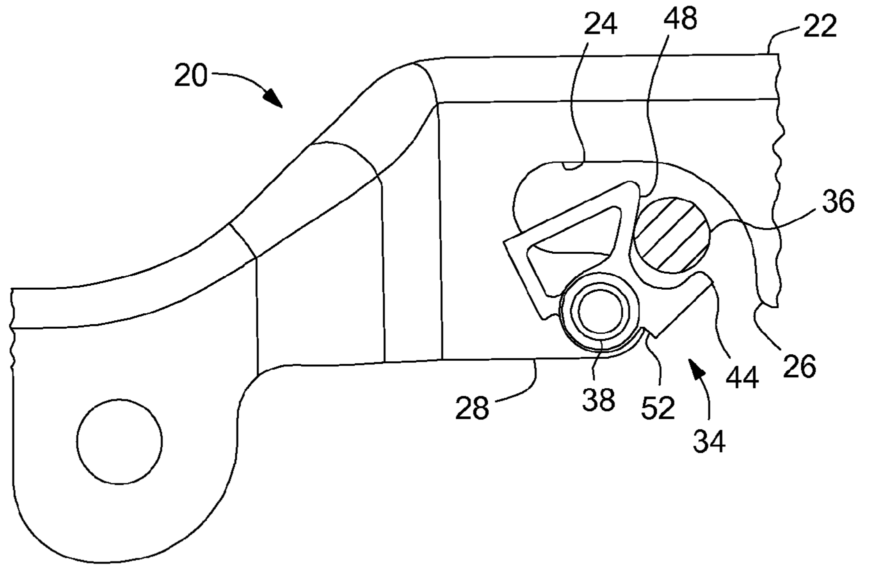
FIG. 3 is a view similar to FIG. 2, but illustrating the clip and rod in a partially installed position.
Figure 4:
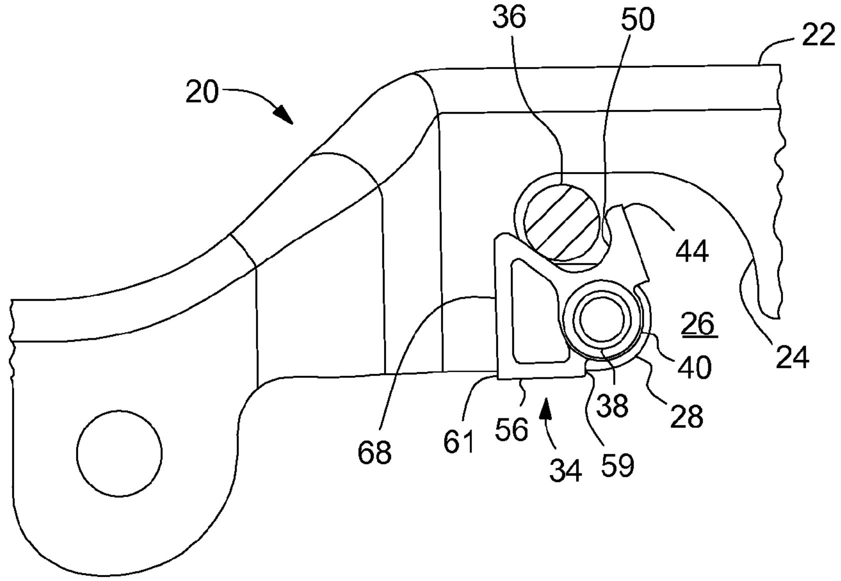
FIG. 4 is a side view similar to FIG. 2, but illustrating the clip and rod in a fully installed (trapped) position.
Figure 5:
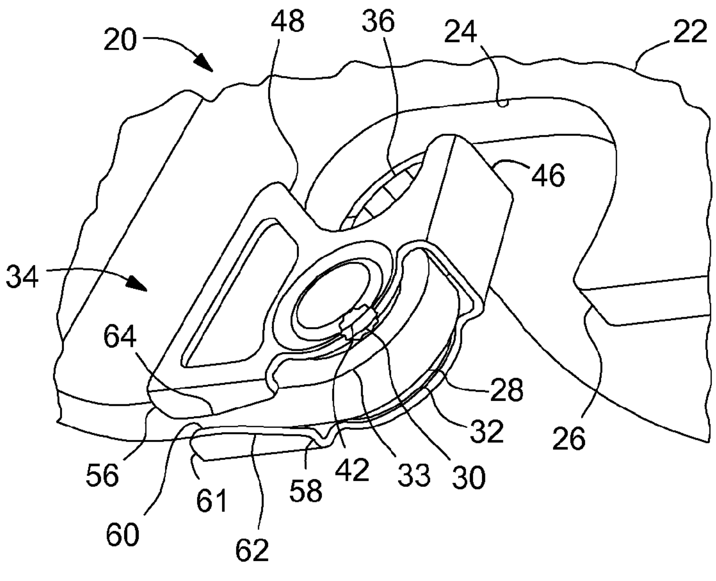
FIG. 5 is a perspective view, on an enlarged scale, of the rod retaining clip assembly, in the installed position illustrated in FIG. 4.

The initial torque rod installation continues by locating the torque rod 36 in the rod recess 50 (shown in FIG. 2). The assembler then pushes upward on the torque rod 36. As the assembler pushes upward, the upward force will press the rounded hold-open portions 58 against the sides 32, 33 of the support arm 28, causing the clip retention flanges 56 to elastically flex away from each other. As the torque rod 36 is pushed farther upward, through the rod channel opening 26, the clip 34 rotates relative to the clip support arm 28. This causes the tapered clip spreading portions 60 to slide along the sides 32, 33, in turn causing the retention flanges 56 to gradually spread open farther (shown in FIG. 3). As the assembler pushes the torque rod 36 farther into the rod channel 24, eventually the retaining clip 34 will rotate far enough that the clip securing portions 62 slide past the sides 32, 33 of the support arm 28, allowing the clip retention flanges 56 to spring back towards each other (shown in FIGS. 4 and 5). The initial torque rod installation is now complete.

With the clip securing portions 62 snapping back towards each other, the clip securing portions 62 self-engage to hold the retaining clip 34 in this fully installed (trapped) position without any further actions on the part of the assembler. Of course, the length of the rod retention flange 44 and the dimensions of the rod channel 24 are determined so that a final gap between the two is less than the diameter of the torque rod 36. In this way, even though the torque rod 36 is not tightly retained in the rod channel 24, the retaining clip 34 positively secures both itself and the torque rod 36 in the fully installed positions. Accordingly, this portion of the assembly process is relatively quick, simple, and reliable. Once the torque rod 36 is pushed into its desired position, the torque rod 36 will be positively retained in this desired position on the vehicle as the vehicle proceeds through paint operations—without requiring that the torque rod 36 be wound up during these operations.

After paint operations, the torque rod 36 is still positively retained in position, ready to be wound up (pre-stressed) during final assembly operations for the vehicle. After the torque rod 36 is wound up, the retaining clips 34 are no longer needed, but can be left in place since they do not interfere with the operation of the torque rod 36 or the vehicle closure. Thus, the relatively low cost of the retaining clip 34 is desirable since it is only used during a portion of the vehicle assembly process.

Figure 6:
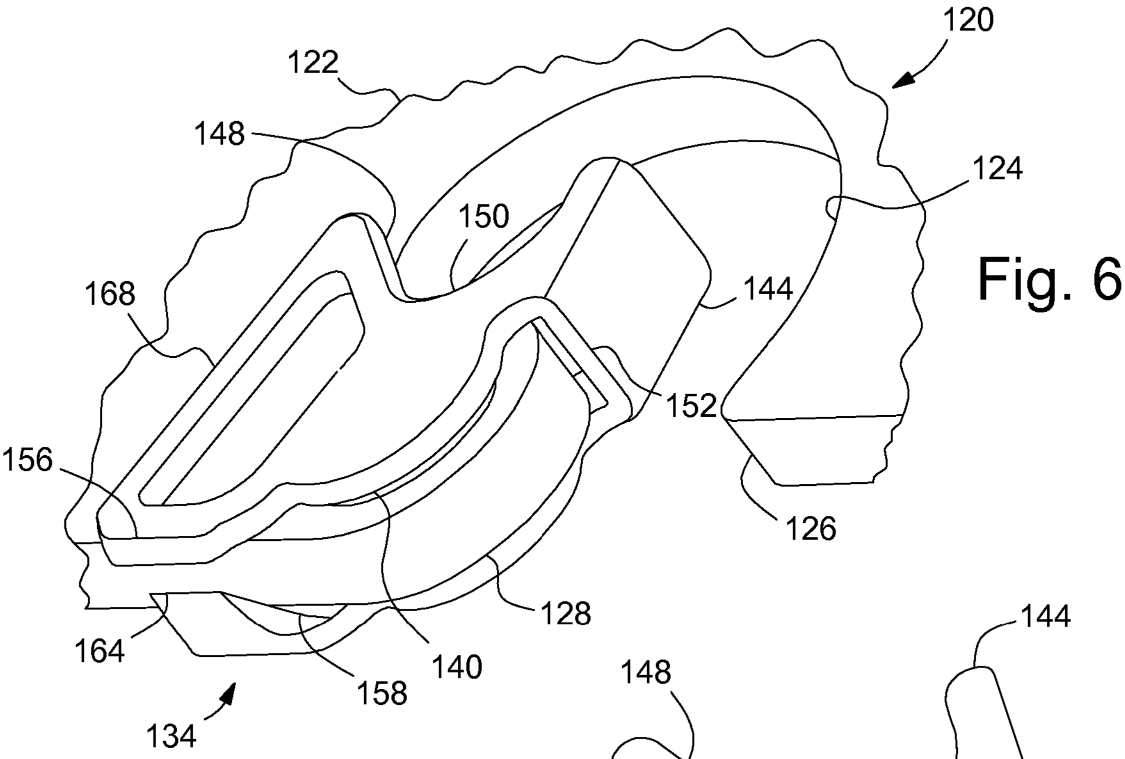
FIG. 6 is a perspective view of a self-engaging rod retaining clip, according to a second embodiment, mounted on the vehicle closure support component.
Figure 7:
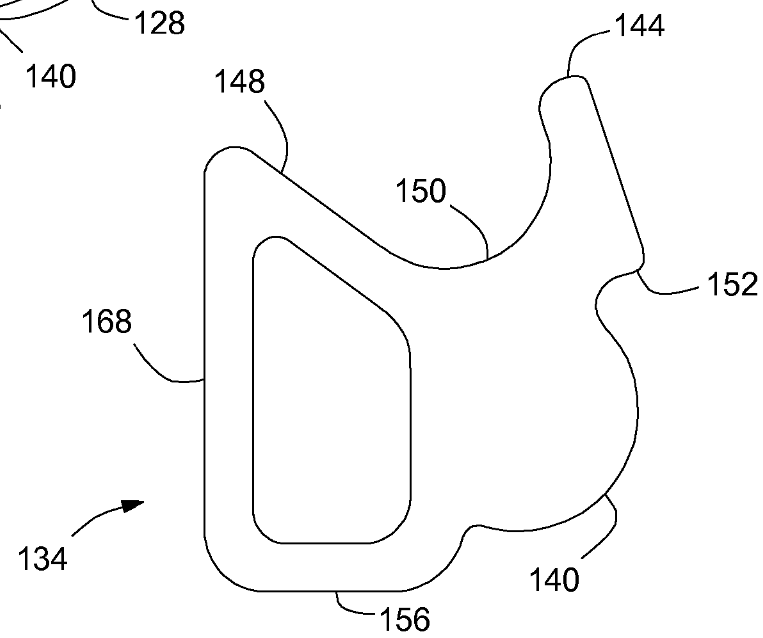
FIG. 7 is a side view of the clip of FIG. 6.
Figure 8:
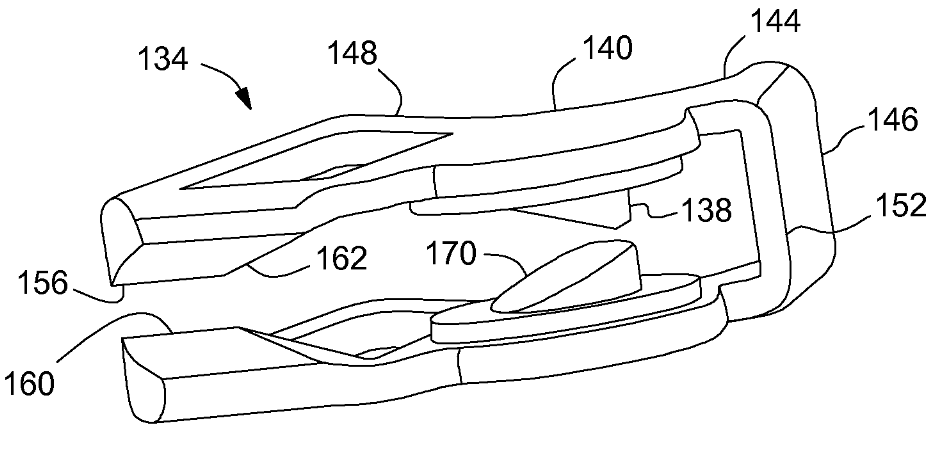
FIG. 8 is a perspective view of the clip of FIG. 6.

FIGS. 6-8 illustrate a second embodiment. Since this embodiment is similar to the first, similar element numbers will be used for similar elements, but employing 100-series numbers.

The vehicle closure support component 120 still includes a main body 122 defining a rod channel 124 having a rod channel opening 126. A clip arm support 128 extends out and supports a self-engaging rod retaining clip 134.

The rod retaining clip 134 still includes a clip main body 140 from which a rod retention flange 144, having a central web 146, and a pair of rod pivoting flanges 148 extend. The main body 140, retention flange 144 and pivoting flanges 148 define the rod recess 150, and the central web 146 has an end 152 for abutting the support arm 128. A pair of clip retention flanges 156 still extend from the main body 140, with each including a hold-open portion 158, clip securing portion 160 and clip spreading portion that together define an arm slot 164. Again, clip support flanges 168 may extend between the clip retention flanges 156 an the rod pivoting flanges 148.

The rod retaining clip 134 differs from the first embodiment in that it now includes a pair of pivot pin flanges 138, with each pivot pin flange 138 including a tapered surface. Preferably, the pivot pin flanges 138 are integral with the clip main body 140. This clip 134, then, may be molded from plastic, for example. The term integral, as used herein, means that the particular feature (portion) is made from the same piece of material as the area around it, forming a single monolithic part, rather than being formed separately first and then later attached by fasteners, welding, adhesive, etc. An advantage with this embodiment, then, is that no separate pin must be installed and secured in place. The clip 134 is slid over the support arm 128 with the clip oriented so that the thin side of the pivot pin flanges 138 engage the support arm 128 first. As the clip 134 slides further on, the tapered surfaces 170 will cause the clip to gradually flex open until the pivot pin flanges 138 align with and snap into a pivot hole (not shown in the second embodiment) of the support arm 128. The clip 134 is now secured to and can pivot relative to the support arm 128. The installation of a torque rod is the same as the first embodiment.

While certain embodiments of the present invention have been described in detail, those familiar with the art to which this invention relates will recognize various alternative designs and embodiments for practicing the invention as defined by the following claims.

What is claimed is:

1. A self-engaging rod retaining clip assembly for retaining a rod comprising:

a vehicle closure support component including a main body defining an arcuate-shaped rod channel having a rod channel opening, and a clip support arm extending from the main body adjacent to the rod channel and the rod channel opening, the clip support arm having a first side and an opposed second side and including an arm pivot hole recessed in the first and second sides; and a rod retaining clip including a clip main body having a rod retention flange extending from the clip main body outside of the rod channel when the rod retaining clip is in a pre-rod installation position; a rod pivoting flange extending from the clip main body across a portion of the rod channel opening when the rod retaining clip is in the pre-rod installation position, with the clip main body, the rod retention flange and the rod pivoting flange defining a rod recess that is shaped to receive the rod therein; a pair of clip retention flanges extending from the main body and defining an arm slot therebetween, the clip retention flanges each having a hold-open portion where a width of the arm slot between the hold-open portions is about equal to a width of the support arm, a clip securing portion where the width of the arm slot between the clip securing portions is less than the width of the arm slot between the hold-open portions, and a tapered clip spreading portion extending between the respective hold-open portions and clip securing portions; and a pivot pin pivotally securing the rod retaining clip to the clip support arm.

2. The retaining clip assembly of claim 1 wherein the clip main body includes a pair of clip pivot holes coaxially aligned with the arm pivot hole, and the pivot pin extends through the pair of clip pivot holes and the arm pivot hole to pivotally secure the rod retaining clip to the clip support arm.

3. The retaining clip assembly of claim 1 wherein the pivot pin is a pair of opposed pivot pin flanges extending from and integral with the clip main body.

4. The retaining clip assembly of claim 3 wherein the pivot pin flanges each include a tapered surface facing toward the clip support arm.

5. The retaining clip assembly of claim 1 wherein the rod retention flange includes a central web having an end in contact with the clip support arm when the rod retaining clip is in the pre-rod installation position.

6. The retaining clip assembly of claim 1 wherein the rod retaining clip includes a clip support flange extending between the rod pivoting flange and one of the clip retention flanges.

7. The retaining clip assembly of claim 1 wherein the vehicle closure support component is a hinge link.

8. The retaining clip assembly of claim 1 wherein the rod retaining clip includes a second rod pivoting flange, spaced from the rod pivoting flange, and extending from the clip main body across a portion of the rod channel opening when the rod retaining clip is in the pre-rod installed position.

* * * * *